3,252,936
Patented May 24, 1966

3,252,936
POLYMER OF 3,3-BIS(CHLOROMETHYL)OXE-
TANE STABILIZED WITH METHYL CIS-3,6-
ENDOMETHYLENE - 1,2,3,6 - TETRAHYDRO-
PHTHALIC ANHYDRIDE
Douglas Stephen Richart, Wyomissing, Pa., assignor, by mesne assignments, to The Polymer Corporation, a corporation of Pennsylvania
No Drawing. Filed Aug. 20, 1962, Ser. No. 218,122
1 Claim. (Cl. 260—45.8)

This invention relates to improved polymeric materials and more particularly to a heat-stabilized chlorinated polyether resin.

The chlorinated polyether resins with which this invention is concerned are those polymerized from 3,3-bis(chloromethyl)oxetane. These resins are sold under the trademark "Penton."

While chlorinated polyethers of the class described are known for their chemical stability, they are subject to some degradation at elevated temperatures. Such degradation may cause serious problems when the resins are raised to temperatures above their melting point during certain forming operations, such as, for example, extrusion, molding and fusion coating. Particularly severe, due to the relatively high temperatures that must be used, are the thermal requirements imposed on these resins by the fluidized bed coating process.

Accordingly, it is the object of this invention to provide chlorinated polyether resins of the class described that have improved stability at elevated temperatures.

Briefly the object of this invention is obtained by incorporating cyclic anhydrides within the resinous material.

It has been found that methyl cis-3,6-endomethylene-1,2,3,6-tetrahydrophthalic anhydride is particularly effective to inhibit thermal degradation of chlorinated polyether resins. Relatively small quantities of this anhydride, as between about ¼% to 10% by weight, produce desirable results.

*Example*

A polymer prepared from 3,3-bis(chloromethyl)oxetane sold under the trade designation "Penton" was ground until all of the material would pass through a 100 mesh screen. A portion of this material was set aside as a control and the remaining portion was thoroughly mixed with 4% by weight methyl cis-3,6-endomethylene-1,2,3,6-tetrahydrophthalic anhydride sold under the trade designation "Methyl Nadic Anhydride."

Steel panels 1″ x 4″ x ¼″ were heated in a convection oven for 20 minutes at 700° F. and then immersed for about 20 seconds in fluidized beds containing the resin samples.

The steel panels were then removed from the fluidized beds and a uniform coating of about 30 mils of resin was observed smoothly adhered to their surfaces. These coatings were stripped from the panels and the degradation of the resin due to exposure to coating temperatures was determined by specific viscosity measurements (these measurements were taken with 0.25 gram resin dissolved in 25 milliliters of cyclohexanone at 50° C.). These results are given in Table I.

| Specific viscosity | Before coating | After coating |
|---|---|---|
| Control | 1.24 | 0.87 |
| Resin with Anhydride | 1.29 | 1.11 |

"Penton" is chlorinated polyether having the following formula $$-O-CH_2-\underset{\underset{CH_2Cl}{|}}{\overset{\overset{CH_2Cl}{|}}{C}}-CH_2-O-CH_2-\underset{\underset{CH_2Cl}{|}}{\overset{\overset{CH_2Cl}{|}}{C}}-CH_2-O-CH_2-\underset{\underset{CH_2Cl}{|}}{\overset{\overset{CH_2Cl}{|}}{C}}-CH_2-O-$$

and has an average molecular weight of 250,000 to 350,000. Chlorine constitutes approximately 46 percent by weight of the polymer. The "Penton" is linear in nature and crystalline in character.

"Methyl Nadic Anhydride" has the following formula

The position of the double bond and the methyl group of the individual isomers comprising this mixture are unknown. The methyl group in this formula is drawn as being attached to the center of one ring to indicate that it replaces one of the hydrogens shown in the formula.

I claim:

A heated stabilized resin adapted for use in heat fusion processes comprised of the film-forming chlorinated polyether prepared from 3,3-bis(chloromethyl)oxetane and from ¼% to 10% by weight of methyl cis-3,6-endomethylene-1,2,3,6-tetrahydrophthalic anhydride.

References Cited by the Examiner

UNITED STATES PATENTS

| 2,394,417 | 2/1946 | Yngve | 260—45.8 |
| 2,820,774 | 1/1958 | Myers et al. | 260—45.95 |
| 2,868,745 | 1/1959 | Canarios | 260—45.95 |
| 2,881,151 | 4/1959 | Young et al. | 260—45.95 |
| 2,947,722 | 8/1960 | Boardman | 260—2 |

OTHER REFERENCES

Lee et al.: "Epoxy Resins," McGraw-Hill Book Co., New York (1957), (pages 117 and 134 relied upon).

LEON J. BERCOVITZ, *Primary Examiner.*

FRED E. McKELVEY, *Assistant Examiner.*